Figure 3:
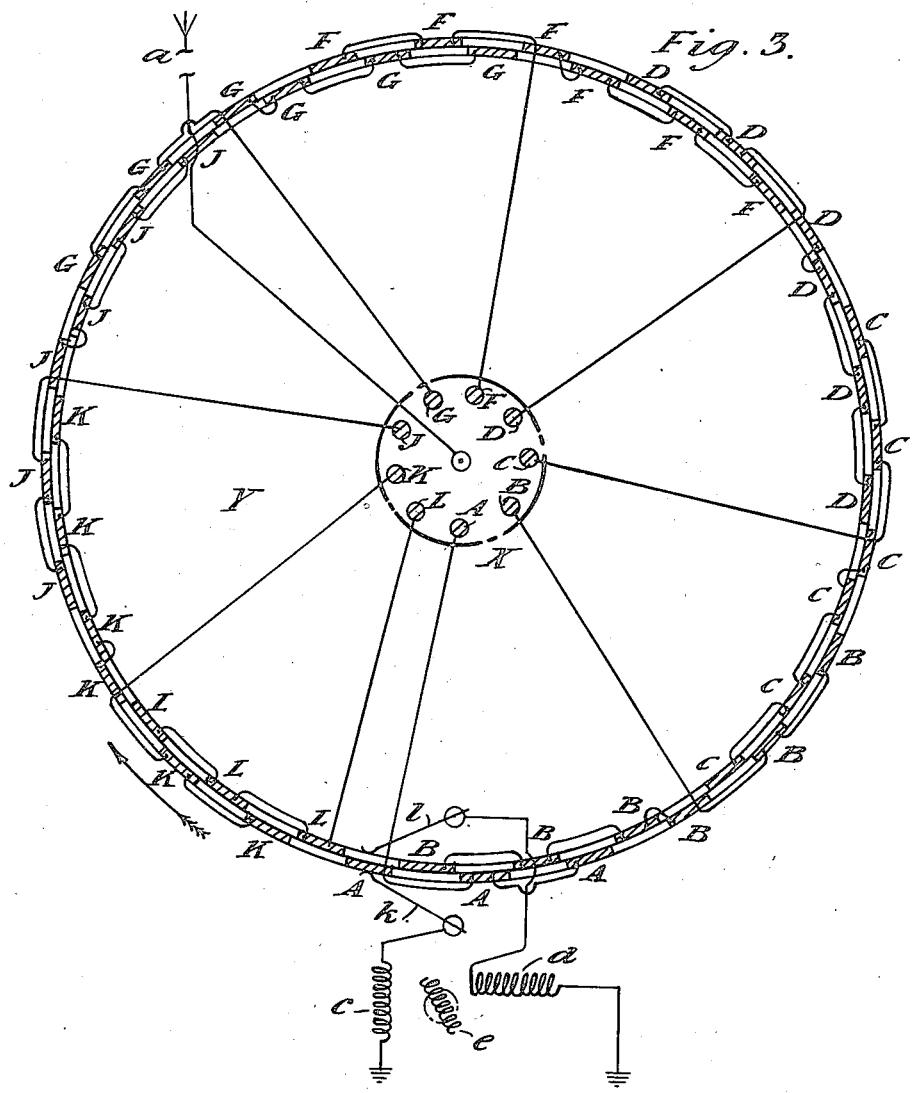

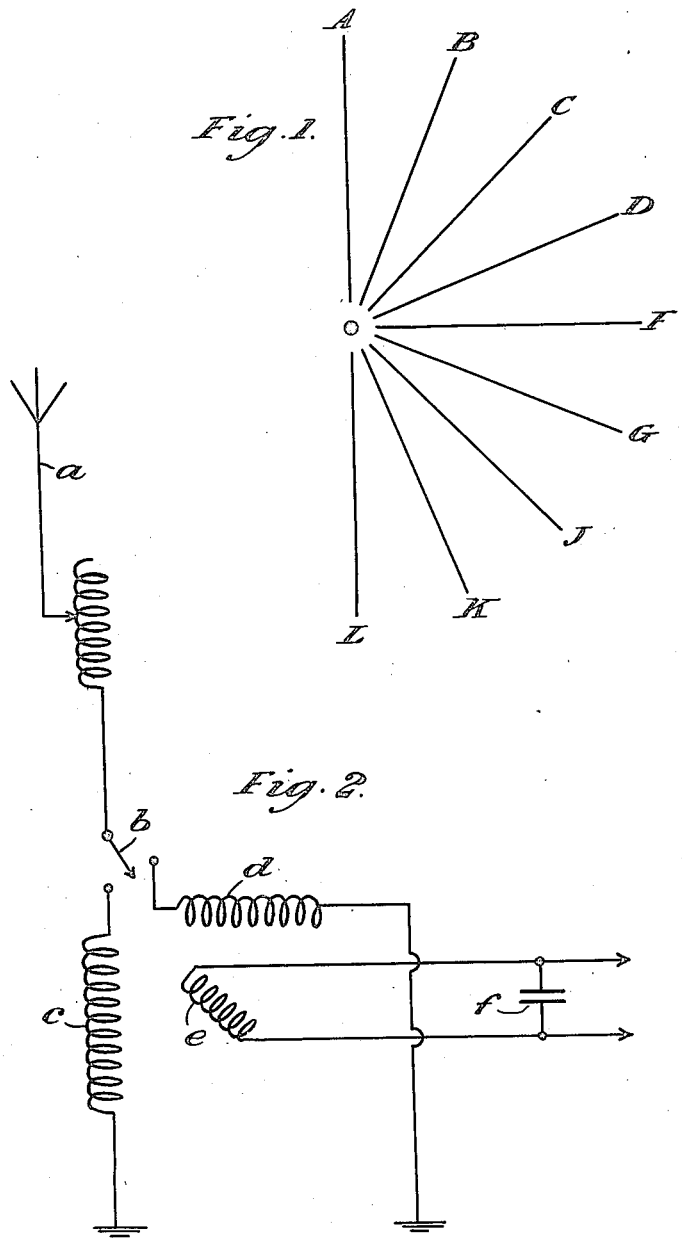

UNITED STATES PATENT OFFICE.

JAMES ERSKINE-MURRAY AND JAMES ROBINSON, OF BIGGIN HILL, ENGLAND.

WIRELESS RECEIVING AND TRANSMITTING APPARATUS.

1,398,848.  Specification of Letters Patent.  Patented Nov. 29, 1921.

Application filed March 30, 1920. Serial No. 369,892.

*To all whom it may concern:*

Be it known that we, JAMES ERSKINE-MURRAY and JAMES ROBINSON, both subjects of the King of Great Britain, both residing in Biggin Hill, England, have jointly invented certain new and useful Improvements in or Relating to Wireless Receiving and Transmitting Apparatus, of which the following is a specification.

This invention relates to wireless transmitting and receiving apparatus whereby the receiving station can determine its bearing relatively to the transmitting station, and more particularly to receiving apparatus for use in conjunction with transmitting systems in which the intensity of radiation is a maximum and minimum in directions which can be changed according to a pre-arranged plan known to the receiver.

The transmitting apparatus which it is proposed to use in connection with receiving apparatus forming the subject matter of this invention is of a known type by which signals can be transmitted having a maximum and minimum intensity along defined directions. This transmitting apparatus is arranged to send a sequence of different signals at regular intervals of time, the first of said signals having its maximum intensity along a definite direction, say north, and the subsequent signals along lines at angles to the first direction which increase by equal amounts, preferably by sub-multiples of 180°.

The operator at the receiving station can more or less readily distinguish which two signals received by him are of an intensity greater or less than that of the other signals from which the receiving station will be known to lie along a line between the directions of these two signals, The object of the present invention is to determine with greater accuracy than is possible at present with this type of apparatus the direction line of the receiving station. For this purpose in accordance with this invention the receiving apparatus is arranged so that, the operator having determined the direction lines of the two signals which are of least intensity, these signals are equalized in intensity by the movement or adjustment of an element in the receiver, and the amount of the movement or adjustment necessary to obtain equality is arranged to give a measure of the differences between the direction line of the receiver and the two directions previously obtained.

In one form of receiving apparatus two identical coils are arranged to be placed alternatively in the aerial circuit and a coil in the receiver circuit is arranged between, and inductively coupled to, the two first-named coils so that its position relatively thereto can be adjusted until the two successive least intensity signals on being passed respectively through the two coils are heard as of equal intensity.

The adjustable element of the receiving circuit may be such other known quantities as resistance or capacity and the equalization of the signals may be obtained by variations of such quantities.

The invention is illustrated diagrammatically in the accompanying drawings, in which Figure 1 is a plan of the directional aerials of a transmitting system; Fig. 2 is a simple form of receiving system; and Fig. 3 is a constructional form of receiving system.

As shown in Fig. 1, the angle between the aerials of each adjacent pair of the transmitting directional aerials A, B, C, D, etc., is the same, so that when transmission takes place from these aerials in turn, a distant receiving station observes that the successive signals vary in strength. It will be noted that the minimum intensity is on one of the signals or between two consecutive signals. This fact alone will give an approximate idea of the bearing of the beacon or transmitting station.

By using a receiving station as shown in Fig. 2, an increased accuracy of bearing can be obtained. As shown, the receiving station consists of any ordinary aerial $a$ with a two-way switch $b$ leading through two identical inductances $c$ and $d$ to earth. In place of a plain aerial, it will be understood that loop reception might be used. A coupling coil $e$ is arranged symmetrically between the inductances $c$ and $d$, and so as to give any amount of coupling with $c$ and $d$ from zero up to maximum. A convenient arrangement is for the inductances $c$ and $d$ to be at right angles, and the coil $e$ to be rotatable symmetrically between $c$ and $d$. From coil $e$ connections are taken to a condenser $f$ for tuning purposes and to a receiver or amplifier.

Various methods of operating the systems may be employed. For example, transmission from the beacon station may take place as follows:—

From the respective aerials preliminary single signals are sent in consecutive order such as the letter A on the first aerial, the letter B on the second and so on, each aerial repeating its letter a few times.

After one complete series of transmissions has taken place, the letters A and B are sent alternately for a few times, say three, each letter on its own aerial, then the letters B and C are sent alternately for a few times, say three, on their own aerials, then similarly the letters C and D on their aerials, and so on.

The receiving station may proceed by listening for the first series of signals, i. e. when the aerials send consecutive signals A, B, C, D etc. From this it is observed that the minimum signal is between two of the aerials, say between C and D. During this time the two-way switch $b$ may be used on one stud only, say on to inductance $c$, and the tightest coupling may be between inductances $e$ and $c$. When the second series of signals starts, i. e. AB, AB, AB, BC, BC, BC, etc., the receiving station will listen for the series CD, CD, CD, and on hearing these the two-way switch will be used by switching to inductance $c$ for the C signals and inductance $d$ for the D signals. The coil $e$ will then be rotated until the signals are of equal intensity. From the degree of coupling between inductance $e$ and inductances $c$ and $d$ it is possible to calculate the actual direction of minimum transmission between the aerials C and D.

Fig. 3 shows a more convenient arrangement of receiving gear comprising the elements shown in Fig. 2 for carrying out the invention. Here, a device corresponding to switch $b$ of Fig. 2 is made more or less automatic. The gear comprises a disk Y having a number of contacts AAA, BBB, etc. at its periphery connected, as shown, with a hub plate X, connected with the aerial. The disk and its hub are made to rotate so that the peripheral contacts alternately automatically complete circuits from the aerial to the inductances $c$ and $d$ through wipes $k$ and $l$. It will be seen that as the disk rotates, circuits are completed as follows through contacts AB, AB, AB, then BC, BC, BC, and so on; also that for the series AB, AB, AB, signal A is sent through the inductance $d$ and signal B through the inductance $c$. For the series BC, BC, BC, signal B is sent through the inductance $d$, and signal C through the inductance $c$.

If each transmitted signal takes the same interval of time, it is possible to arrange the speed of rotation of the disk so that the respective contacts are made at the correct time. Then the coil $e$ can be rotated by hand to equalize the two consecutive signals between which the minimum lies.

It is to be understood that the method of transmission, i. e. AB, AB, AB, BC, BC, BC, is only one way of effecting the invention. Other methods of transmission might be used, e. g. A, B, C, D, E, F, . . . i. e. one signal on each aerial, or there may be three of four A's on the first aerial, three or four B's on the second aerial and so on, and this procedure repeated a few times.

Again, instead of comparing signals from consecutive aerials, the system might be arranged so that the signals from say B and D, or B and E, can be compared.

It is also to be understood that the use of couplings $e$ to $c$ or $e$ to $d$ is for the purpose of comparing the effects in two aerials. This comparison can be effected in other ways such as by shunting the telephones in one case by a resistance, and by shunting one of the inductances $c$ or $d$ by a variable resistance.

When the minimum signal is on one of the aerials, a pair of least intensity signals from aerials on each side is compared in the receiver.

Having thus described the nature of the said invention and the best means we know of carrying the same into practical effect, we claim:—

1. Wireless direction finding apparatus for use with transmitting systems in which the intensity of radiation is a maximum and minimum in directions which can be changed according to plan, comprising at the receiving station an aerial circuit, two identical coils arranged at an angle with each other, means for including said coils alternately in the aerial circuit, a receiving circuit and an element in the said receiving circuit which can be adjusted in position with respect to the said two identical coils until the successive least intensity signals passed consecutively through the said two coils are heard as being of equal intensity, the position of the adjustable element being utilized to determine direction, substantially as described.

2. Wireless direction finding apparatus according to claim 1, comprising a coil in the receiver circuit arranged between and inductively coupled to the aerial coils, substantially as described.

3. Wireless direction finding apparatus according to claim 1, comprising a rotary switch for alternately placing the aerial coils in circuit, said rotary switch having contacts corresponding to each transmitting aerial and connected with the receiving aerial.

4. Wireless direction finding apparatus according to claim 1, comprising a rotary switch for alternately placing the aerial coils in circuit, said rotary switch having contacts corresponding to each transmitting aerial and connected with the receiving aerial, said switch being rotated sychronously with the transmission of signals in different transmitting aerials.

5. Wireless direction finding apparatus, according to claim 1, comprising a rotary switch for alternately placing the aerial coils in circuit, said rotary switch having a plurality of contacts corresponding to each transmitting aerial and connected with the receiving aerial.

In testimony whereof, we have signed our names to this specification.

JAMES ERSKINE-MURRAY.
JAMES ROBINSON.